Patented June 1, 1937

2,082,459

UNITED STATES PATENT OFFICE 2,082,459

METHOD FOR PRODUCING SUBSTITUTED ALIPHATIC ACIDS

Joseph B. Niederl, Brooklyn, N. Y.

No Drawing. Application March 29, 1933, Serial No. 663,427

7 Claims. (Cl. 260—110)

This invention relates to a method of producing substituted aliphatic acids, and more particularly to a method of producing phenolic aliphatic acids either by reacting an unsaturated aliphatic acid with a phenol in the presence of a kationoid condensing agent or by intramolecular rearrangement of the isomeric phenoxy aliphatic acid in the presence of a kationoid catalyst.

Hitherto it was not possible to produce phenolic aliphatic acids by either of the above methods.

It has been found that phenolic aliphatic acids of the general formula

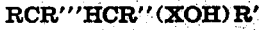

are readily obtained either by reacting an unsaturated aliphatic acid of the general formula

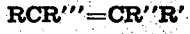

with a phenol in the presence of a kationoid condensing agent or by intramolecular rearrangement of a phenoxy aliphatic acid of the general formula

in the presence of a kationoid catalyst.

In these formulas R represents hydrogen or a saturated or unsaturated acyclic or alicylic radical which may contain one or more substituents such as a hydroxyl, carbonyl, carboxyl, sulfo- or nitro- group or a halogen atom; R' represents a carboxyl group, R'' and R''' hydrogen or a saturated or unsaturated acyclic or alicyclic radical which may contain one or more substituents such as a hydroxyl, carboxyl, carbonyl, sulfo- or nitro- group or a halogen atom.

X represents a phenyl, naphthyl, tetrahydronaphthyl or any other aryl radical which may be substituted by any aryl, alkyl or aralkyl group, unsubstituted or substituted by a nitro, halogen, or hydroxyl, carbonyl, carboxyl, azo, and sulfo group.

The terms "kationoid condensing agent" and "kationoid catalyst" are used herein and in the claims appended hereto in the sense of the recent electronic postulations of Robert Robinson, compare for instance his book on "Versuch einer Elektronentheorie organisch-chemischer Reaktionen", Verlag Ferdinand Enke, Stuttgart, 1932, especially page 16. Such agents are for instance substances possessing latent valences, such as acids, metal atoms which are able to form coordination systems with water or ammonia, sulfur from sulfur trioxide, sulfuric acid, acid sodium sulfite, atoms and free radicals with incomplete electron shells.

Thus, one object of this invention is to produce phenolic aliphatic acids by reacting an unsaturated aliphatic acid with a phenolic compound in the presence of a kationoid condensing agent.

Another object of this invention is to produce phenolic aliphatic acids by intramolecular rearrangement of a phenoxy aliphatic acid to the corresponding isomeric phenolic aliphatic acid in the presence of a kationoid catalyst.

A further object of this invention is the use of a mixture of glacial acetic acid and concentrated sulfuric acid as kationoid agent in which case instead of glacial acetic acid any other solvent for one or all of the reacting compounds may be used.

Still another object of this invention consists in the preparation of soaps containing a phenolic group in their molecule which products possess very valuable pharmaceutical properties.

A further object is the production of chaulmoogric acid and its homologues and substitution products containing a phenolic group in their molecule which compounds have very remarkable therapeutical properties.

Still another object of this invention is the use of the products obtained according to the above described methods in pharmaceutical preparations, salves, ointments, creams and the like, thereby including substances in these preparations which combine the phenolic characteristics with those of the aliphatic acids and esters and their derivatives within one and the same molecule.

With the above and other objects in view, all of which will fully appear in the following description and claims, the present invention will hereinafter be more fully described in the following examples.

*Example 1.—Addition of oleic acid to meta-cresol*

Equimolecular mixtures of oleic acid and meta-cresol are mixed under cooling with sulfuric acid. The mixture is allowed to stand for several days until the entire mass has become viscous. The mass is then poured into cold water, washed until the sulfuric acid is removed, dissolved with alkali, filtered, reprecipitated with acid and finally distilled in vacuo. The product obtained is of a pleasant, thymol-like odor and shows the characteristics of a fatty acid as well as of a phenol. Its melting point is about 37° C. In place of the m-cresol shown in this example phenol may be used in which case the product is 10 (p-hydroxyphenyl) stearic acid.

*Example 2.—Addition of erucic acid to phenol*

Equimolecular amounts of erucic acid and phenol are dissolved in four times their amount of glacial acetic acid. Then the same amount of concentrated sulfuric acid is added to make a sulfuric acid-acetic acid mixture in the proportion of 1:4, and the mass is heated for several hours to 120° C. Thereafter, the mixture is cooled and diluted with water while cooling. The acid is purified as described in Example 1 by dissolving in alkali, reprecipitation and vacuum distillation or it is recrystallized from alcohol.

*Example 3.—Addition of elaeostearic acid to phenol*

Equimolecular amounts of elaeostearic acid and phenol are dissolved in ten times their amount of glacial acetic acid and a current of dry hydrochloric acid is introduced into the mixture until a viscous mass is obtained on dilution with water. The temperature is kept at about 100° C. The mixture is then poured into water and the product is isolated and purified according to the methods described in Examples 1 and 2. The product obtained contains still another unsaturated group and can be subjected to further reaction with phenol in a mixture of glacial acetic acid and concentrated sulfuric acid according to Example 2.

*Example 4.—Addition of sorbic acid to xylenol*

Sorbic acid and a mixture of xylenols are dissolved in glacial acetic acid and to this solution aluminum chloride is added. The resulting mixture is then heated under a reflux until the condensation is complete. The product is isolated and purified as described in Examples 1 and 2.

*Example 5.—Addition of chaulmoogric acid to phenol*

Equimolecular amounts of chaulmoogric acid and phenol are dissolved in the same amount of concentrated sulfuric acid and care is taken that the temperature does not exceed 30° C. After allowing the mixture to stand for several hours at room temperature the condensation is completed, the reaction mixture is diluted with water while cooling and the reaction product is isolated and purified according to Examples 1 and 2.

*Example 6.—Addition of the ethyl ester of hydnocarpic acid to resorcinol*

The ethyl ester of hydnocarpic acid is dissolved in five times its weight of glacial acetic acid. To this solution a mixture of the equimolecular amount of resorcinol in a mixture of glacial acetic acid and concentrated sulfuric acid in the proportion of 5:1 is added while stirring vigorously. The mixture is then heated under reflux for several hours and the reaction product isolated and purified according to the Examples 1 and 2. It is also possible to esterify the acids obtained according to these examples with alcohols in the presence of sulfuric acid, instead of starting with the esters.

*Example 7.—Addition of oleic acid to hydroquinone*

Equimolecular amounts of oleic acid and hydroquinone are introduced gradually into fused toluene sulfonic acid. The reaction mixture is diluted with water after cooling, and extracted with ether. After evaporation of the ether, the oleic acid-hydroquinone condensation product is purified by vacuum distillation.

*Example 8.—Addition of elaidic acid to pyrogallol*

Equimolecular amounts of elaidic acid and pyrogallol are dissolved in glacial acetic acid and dry hydrochloric acid is introduced into the solution while boiling under reflux. After several hours, the reaction product is isolated and purified according to Examples 1 and 2.

*Example 9.—Addition of chaulmoogric acid to guaiacol*

Equimolecular amounts of chaulmoogric acid and guaiacol are dissolved in glacial acetic acid and heated with zinc chloride under reflux. After several hours the reaction product is isolated and purified according to Examples 1 and 2.

*Example 10.—Addition of ricinoleic acid to tetrahydronaphthol*

Ricinoleic acid and tetrahydronaphthol are suspended in saturated aliphatic hydrocarbons, such as hexanes, and, after addition of concentrated sulfuric acid, is heated under reflux while stirring vigorously. After several hours the reaction is complete and the reaction product is isolated by distillation with steam to remove the hexanes and purified according to Examples 1 and 2.

*Example 11.—Addition of olein to salicylic acid*

Equimolecular amounts of olein and salicylic acid are dissolved while cooling in a mixture of sulfuric acid and glacial acetic acid (proportion 1:5), then heated gently for several hours at 50° to 60° C. The reaction product is isolated and purified in the manner described in the preceding examples.

*Example 12.—Addition of castor oil to vanillin*

Vanillin with twice its weight of castor oil is dissolved in a mixture of equal parts of acetic acid anhydride and glacial acetic acid. To this mixture concentrated sulfuric acid is added while stirring vigorously and keeping the temperature below 40° C. After 24 to 48 hours standing at room temperature the reaction mixture is worked up in the manner described in the preceding examples.

*Example 13.—Addition of tung oil acid to phenol alcohol*

Tung oil acid and a mixture of equimolecular amounts of formaldehyde, dissolved in acetic acid, and phenol, are heated with a mixture of glacial acetic acid and concentrated sulfuric acid and after several hours precipitated by addition of water. The product obtained is a modified phenol-formaldehyde resin with very valuable properties which is soluble in various organic solvents.

*Example 14.—Rearrangement of cresoxy stearic acid*

Bromo stearic acid, obtained from oleic acid by the addition of hydrobromic acid, is reacted with potassium meta-cresolate. The latter is heated at about 100° C. in a mixture of glacial acetic acid and sulfuric acid (5:1) for several hours. Thereby a rearrangement takes place yielding the 10-(2-hydroxy 3-methyl phenyl) stearic acid. This acid can also be obtained according to Example 1.

*Example 15.—Rearrangement of para chlorophenoxy chaulmoogric acid*

The potassium salt of para-chlorophenol and bromo chaulmoogric acid are reacted with each other to form para chlorophenoxy chaulmoogric acid which latter then is rearranged to the corresponding 1-hydroxy-5-chlorophenyl chaulmoogric acid by heating in glacial acetic acid in the presence of aluminum chloride. The reaction mixture is worked up in the manner described above.

*Example 16.—Rearrangement of thymoxy stearic acid*

In a suspension of thymoxy stearic acid, obtained from bromostearic acid and the sodium salt of thymol, in staurated petroleum hydrocarbons, boiling between 100° and 120° C., a current of dry hydrochloric acid is introduced while stirring vigorously and keeping the temperature at the boiling point of the solvent. After several hours the rearrangement is completed and the reaction mixture is steam distilled in order to remove the petroleum hydrocarbons. The reaction product may be purified by recrystallization from alcohol.

Although specific examples have been given, the invention is not limited thereto as modifications may be made by those skilled in the art in accordance with the principles set forth herein. Instead of glacial acetic acid, other liquids may be used as solvents for the reactants, such as sulfuric acid itself, or the homologues of acetic acid, such as propionic or butyric acid, or alkyl sulfates or mixtures of solvents with each other and with non-solvents, or other solvents which are not readily attacked by sulfuric acid such as saturated petroleum hydrocarbons, hexane and the like. The solvent may be a solvent for only one of the reactants while the other is merely suspended in the solution. Or liquids may be used which are not solvents for the reactants but in which the latter are merely suspended in very finely comminuted form. Variations in the proportion of solvent to reactants and condensing or rearranging agent may also be made. Instead of sulfuric acid and the other mentioned kationoid agents, other compounds may also be used, such as for instance phosphoric acid, benzene sulfonic acids, boron trifluoride, acid reacting salts, such as acid sodium sulfate, sodium monophosphate and the like, chlorosulfonic acid, alkyl sulfonic acids and many other acid-reacting agents. A mixture of kationoid agents may be employed advantageously.

Instead of the phenols mentioned, other phenols, such as e. g. xylenols, naphthols, tetrahydronaphthols, hydroxy diphenyls, or phenol derivatives, such as nitrophenols, chlorophenols, the sulfonic acids of these phenolic compounds, the esters of salicylic acid, such as the methyl and the phenyl ester, phenol ethers, phenol aldehydes, such as salicyclic aldehyde, and many others may be reacted with the aliphatic acids.

Instead of the unsaturated aliphatic acids mentioned, other acids, such as linoleic acid, or di- and tribasic acids, such as muconic acid, citraconic acid, may be added to the phenol, while their corresponding saturated acids may be used in combination with the phenol for the rearrangement reaction. Likewise the substitution products of these acids may be employed, for instance their halogeno, their sulfo, their hydroxy and the like derivatives. The high molecular oxidation products of petroleum, petroleum wax, brown coal tar and the like which are easily obtained by catalytic oxidation of the above mentioned raw materials and which possess very remarkable disinfecting properties, which is increased considerably by the combination with the phenolic compounds, are also very useful.

The temperature may vary from 0° to 150° C., according to the reactivity of the reactants. The heating may also be carried out under pressure.

When sulfuric acid is used, its concentration is preferably 96%; however, monohydrate or any other suitable concentration of the sulfuric acid may be employed. The duration of the reaction depends upon the temperature, the reactivity of the reactants and the kationoid agent selected and can be varied according to the requirements.

The methods of isolating the reaction product and purifying them can be varied in accordance with the properties of the reactants and reaction products. These and other changes may be made in the invention within the spirit and scope thereof.

The compounds obtained according to the above described methods may be used as such, or in the form of their salts or esters as constituents of soap preparations, especially pharmaceutical ones, shaving creams, tooth pastes and various other toilet preparations. Or they may be used in the treatment of diseases, as for instance the products obtained from chaulmoogric acid for the treatment of leprosy and the like.

What I claim as my invention is:

1. A method of producing phenolic aliphatic acids by reacting an unsaturated aliphatic acid with a phenol in the presence of a mixture of glacial acetic acid and concentrated sulfuric acid.

2. As a new product, 10(p-hydroxyphenyl) stearic acid.

3. As a new product, hydroxy-phenyl dihydro chaulmoogric acid.

4. A method of producing saturated phenolic organic acids containing a free phenolic hydroxyl group in the molecule, by condensing a phenol having an available reactive unsubstituted nuclear position, with an acid of the group consisting of unsaturated aliphatic acids and singly unsaturated alicyclic fatty acids, in the presence of a mixture of concentrated sulfuric acid and glacial acetic acid.

5. A process for preparing hydroxyphenyl dihydro chaulmoogric acid which comprises condensing phenol with chaulmoogric acid in the presence of concentrated sulfuric acid.

6. A product prepared by the condensation of oleic acid with a phenol in the presence of a mixture of sulphuric acid and glacial acetic acid.

7. A saturated hydroxyphenyl carboxylic acid obtainable by condensing a phenol with an acid of the group consisting of unsaturated aliphatic acids and singly unsaturated alicyclic fatty acids in the presence of a mixture of concentrated sulfuric acid and glacial acetic acid.

JOSEPH B. NIEDERL.